United States Patent
Nishimura

(10) Patent No.: US 10,235,976 B2
(45) Date of Patent: Mar. 19, 2019

(54) VEHICLE DISPLAY DEVICE FOR CHANGING THE POSITION OF DISPLAYED TRAFFIC INDICATORS BASED ON THE ROAD HAVING LEFT OR RIGHT SIDE TRAFFIC

(71) Applicant: TOYOTA JIDOSHA KABUSHIKI KAISHA, Toyota-shi, Aichi-ken (JP)

(72) Inventor: Naoki Nishimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/374,516

(22) Filed: Dec. 9, 2016

(65) Prior Publication Data
US 2017/0301318 A1    Oct. 19, 2017

(30) Foreign Application Priority Data
Apr. 19, 2016 (JP) ................................ 2016-083681

(51) Int. Cl.
| G09G 5/38 | (2006.01) |
| G08G 1/0962 | (2006.01) |
| B60K 35/00 | (2006.01) |
| B60R 16/023 | (2006.01) |
| G01C 21/36 | (2006.01) |

(52) U.S. Cl.
CPC .............. *G09G 5/38* (2013.01); *B60K 35/00* (2013.01); *B60R 16/023* (2013.01); *G01C 21/3697* (2013.01); *G08G 1/09623* (2013.01); *G09G 2380/10* (2013.01)

(58) Field of Classification Search
None
See application file for complete search history.

(56) References Cited

U.S. PATENT DOCUMENTS

| 2009/0174533 A1* | 7/2009 | Bowden | B60K 37/02 340/425.5 |
| 2009/0187335 A1* | 7/2009 | Muhlfelder | G01C 21/3635 701/532 |
| 2009/0312888 A1 | 12/2009 | Sickert et al. | |
| 2014/0067259 A1* | 3/2014 | Walsh | G08G 1/09626 701/437 |
| 2014/0306833 A1* | 10/2014 | Ricci | B60Q 1/00 340/901 |

FOREIGN PATENT DOCUMENTS

JP    2012-030611 A    2/2012

* cited by examiner

*Primary Examiner* — Xiao M Wu
*Assistant Examiner* — Steven Z Elbinger
(74) *Attorney, Agent, or Firm* — Oliff PLC

(57) ABSTRACT

A display device for a vehicle, which is installed to a targeted vehicle, selectively makes one of a left side display part, which is at least one of the plurality of display parts and is a position on a more left side than the center of the display means in a lateral direction, and a right side display part, which is at least one of the plurality of display parts and is a position on a more right side than the center, show a passing section-related sign image, indicating whether the vehicles in a country have to keep to the left or keep to the right. The passing-section related sign image corresponds to a road sign representing traffic information related to whether the vehicles have to keep to the left or have to keep to the right, when the identified road sign is the passing section-related sign.

6 Claims, 11 Drawing Sheets

VEHICLE DISPLAY DEVICE FOR CHANGING THE POSITION OF DISPLAYED TRAFFIC INDICATORS BASED ON THE ROAD HAVING LEFT OR RIGHT SIDE TRAFFIC

BACKGROUND OF THE INVENTION

1. Field of the Invention

The present invention relates to a display device for vehicle which is installed to a vehicle and has a display means capable of showing images corresponding to a plurality of road signs, which include a limiting speed sign, a No parking sign, a No overtaking sign, and the like, such that the images are arranged in a lateral direction.

2. Description of the Related Art

Japanese Unexamined Patent Application Publication No. 2012-30611 discloses a vehicle which has display means (liquid crystal display) provided on an instrument panel.

The display means shows, for example, vehicle speed and outside air temperature, and the like.

In addition, the vehicle is equipped with a vehicle-mounted device which can wirelessly communicate with a roadside device installed along a road.

The roadside device sends a variety of traffic information on an area where the roadside device is installed to the vehicle-mounted device. The traffic information received by the vehicle-mounted device is displayed on a sign display unit, which is an area corresponding to a part of the display means, as a plurality of sign images representing road signs.

The sign display unit has display parts which are arranged in a lateral direction. When the vehicle-mounted device receives a plurality of species of traffic information, the display parts display a sign image respectively.

The traffic information represented by each of the sign images includes, for example, limiting speed of a vehicle, lane regulation, and No overtaking (No passing), and the like.

Accordingly, an occupant of the vehicle can recognize not only vehicle speed, outside air temperature and the like but also a variety of traffic information represented by the sign images by watching the display means.

Additionally, in the vehicle of the Japanese Unexamined Patent Application Publication No. 2012-30611, the display position of each of sign images on the sign display unit of display means is set in accordance with a content thereof.

For example, a No overtaking sign image is displayed on the right display part of the sign display unit.

When a vehicle runs on a road of a country, for example Japan, in which vehicles have to keep to the left, the vehicle overtakes while temporarily moving to a lane (traffic lane) next to a lane on which this vehicle is currently running to the right. Therefore, a driver of the vehicle is highly likely to look at a more right side than the front when the driver operates the vehicle to overtake.

Therefore, if the No overtaking sign image is displayed on the right display part of the sign display unit, driver is not likely to get an odd feeling (i.e., the driver feels something is wrong) when the driver watches the No overtaking sign image displayed on the sign display unit.

SUMMARY OF THE INVENTION

By the way, there is a possibility that the vehicle runs on both a road of a country having a type of passing section (transit division, distinction of passage) and a road of another country having another type of passing section. In other words, there is a possibility that the vehicle of the Japanese Unexamined Patent Application Publication No. 2012-30611 runs not only on a road of a country where vehicles have to keep to the left but also on a road of a country where vehicles have to keep to the right.

When the vehicle of the Japanese Unexamined Patent Application Publication No. 2012-30611 overtakes on a road of a country where vehicles have to keep to the right, this vehicle temporarily moves to a lane next to a lane on which this vehicle is currently running to the left. Therefore, the driver of the vehicle is highly likely to look at a more left side than the front when the driver operates the vehicle to overtake.

However, in the vehicle of the Japanese Unexamined Patent Application Publication No. 2012-30611, the display position of each sign image on the sign display unit is fixed at one specific position set for each sign image. In other words, the display means cannot change the display position of each sign image.

Therefore, even when the vehicle of the Japanese Unexamined Patent Application Publication No. 2012-30611 runs on a road of a country where vehicles have to keep to the right, the No overtaking sign image is displayed on the right display part of the sign display unit. As a result, the sign display unit has a large risk of providing an odd feeling to the driver who watches the No overtaking sign image.

The present invention has been made to cope with the above problems, and has an object to provide a display device for vehicle which can make a risk of providing an odd feeling to a driver small, when a passing section-related sign image, which is a sign image corresponding to a road sign related with a passing section, is displayed on the display means in the case where the vehicle runs on both a road of a country having a type of passing section and a road of another country having another type of passing section.

In order to achieve the object, a display device for vehicle (100) of the present invention, which is installed to a targeted vehicle (10) comprises:

passing section determination means (40) determining whether legislation, which defines a passing section of vehicles in a country having a road (80) on which the targeted vehicle is running, lays down that vehicles have to keep to the left or that vehicles have to keep to the right (steps 1003, 1009, 1010);

display means (20) including a plurality of display parts (26A, 26B, 26C, 26D, 26E) arranged in a lateral direction, each of the display parts capable of showing a sign image (26X, 26Y, 27aR, 27aL, 27bR, 27bL, 27cR) corresponding to each of a plurality of road signs (84) including a passing section-related sign (84aL, 84aR, 84bL, 84bR, 84cR) that represents traffic information related with the passing section;

sign information obtaining means (41) obtaining sign information, the sign information identifying the road sign with which a driver of the targeted vehicle has to comply (step 1101); and display position changing means (40) selectively makes one of a left side display part, which is at least one of the plurality of display parts and is position on a more left side than the center of the display means in a lateral direction, and a right side display part, which is at least one of the plurality of display parts and is position on a more right side than the center, show a passing section-related sign image (27aR, 27aL, 27bR, 27bL, 27cR) that is the sign image corresponding to the passing section-related sign based on determination result by the passing section determination means, when the road sign identified based on the obtained sign information is the passing section-related sign (steps 1004, 1105).

Noted that, the "passing section-related sign" is a road sign representing traffic information which is closely related with a passing section of vehicles (in other words, the traffic information is closely related with whether vehicles have to keep to the left or the right). In other words, the "passing section-related sign" is a road sign that is used in only one of a country where the vehicles have to keep to the left and a country where the vehicles have to keep to the right.

The passing section-related sign includes, for example, a No overtaking sign, a No U-turn sign, and a No turn on red sign (a No right-turn on red sign or a No left-turn on red sign).

Noted that, in the following description of this specification, the country where vehicles have to keep to the left is referred to as a "left-hand traffic country", and the country where vehicles have to keep to the right is referred to as a "right-hand traffic country".

The targeted vehicle is likely to run on roads of a variety of countries around the world. In other words, the targeted vehicle is likely to run on a road of a left-hand traffic country and on a road of a right-hand traffic country.

For example, in the case where the targeted vehicle to which the display device for vehicle is installed runs on a road of a left-hand traffic country, when the targeted vehicle is prohibited from overtaking on the road on which this targeted vehicle is currently running, a passing section-related sign image representing No overtaking is displayed on the right display part. In this case, the targeted vehicle overtakes while moving to a lane next to a lane on which the targeted vehicle is currently running to the right. Therefore, a driver of the targeted vehicle is highly likely to look at a more right side than the front when the driver operates the vehicle to overtake. Therefore, when the driver watches the passing section-related sign image, a fear of providing an odd feeling to the driver becomes small by displaying the passing section-related sign image representing No overtaking on the right display part.

On the other hand, in the case where the targeted vehicle runs on a road of a right-hand traffic country, when the targeted vehicle is prohibited from overtaking on the road on which this targeted vehicle is currently running, a passing section-related sign image representing No overtaking is displayed on the left display part. In this case, the targeted vehicle overtakes while moving to a lane next to a lane on which the targeted vehicle is currently running to the left. Therefore, the driver of the targeted vehicle is highly likely to look at a more left side than the front when the driver operates the vehicle to overtake. Therefore, when the driver watches the passing section-related sign image, a fear that the driver gets an odd feeling becomes small by displaying the passing section-related sign image representing No overtaking on the left display part.

According to the present invention, both in a left-hand traffic country and in a right-hand traffic country, the fear of providing an odd feeling to the driver can be small when the passing section-related sign image is displayed on the display means.

In one of aspects of the present invention, the display position changing means is configured so that in the case where the road sign identified based on the obtained sign information is a No overtaking sign (84*a*R, 84*a*L) which is one of the passing section-related signs, the right side display part shows the sign image (27*a*L) corresponding to the No overtaking sign when the passing section determination means determines that vehicles have to keep to the left in compliance with the legislation, whereas the left side display part shows the sign image (27*a*R) corresponding to the No overtaking sign when the passing section determination means determines that vehicles have to keep to the right in compliance with the legislation.

In one of aspects of the present invention, the display position changing means is configured so that in the case where the road sign identified based on the obtained sign information is a No U-turn sign (84*b*R, 84*b*L) which is one of the passing section-related signs, the right side display part shows the sign image (27*b*L) corresponding to the No U-turn sign when the passing section determination means determines that vehicles have to keep to the left in compliance with the legislation, whereas the left side display part shows the sign image (27*b*R) corresponding to the No U-turn sign when the passing section determination means determines that vehicles have to keep to the right in compliance with the legislation.

In one of aspects of the present invention, the display position changing means is configured so that in the case where the road sign identified based on the obtained sign information is either a No right-turn on red sign (84*c*R) or a No left-turn on red sign which is one of the passing section-related signs, the left side display part shows the sign image corresponding to the No left-turn on red sign when the passing section determination means determines that vehicles have to keep to the left in compliance with the legislation, whereas the right side display part shows the sign image (27*c*R) corresponding to the No right-turn on red sign when the passing section determination means determines that the vehicles have to keep to the right in compliance with the legislation.

If the present invention is carried out as these embodiments, both in a left-hand traffic country and in a right-hand traffic country, a fear of providing an odd feeling to the driver can be small when the sign images, which correspond to the No overtaking sign, the No U-turn sign, the No right-turn on red sign, and the No left-turn on red sign, are displayed on the display means.

In one of aspects of the present invention, the display means comprises:

a left-turn sign display part (28) showing that a left direction indicator (17L) installed to the targeted vehicle is operated; and a right-turn sign display part (29) showing that a right direction indicator (17R) installed to the targeted vehicle is operated, the right-turn sign display part positioned on a more right side than the left-turn sign display part.

Furthermore, the plurality of display parts (26A, 26B, 26C, 26D, 26E) are disposed between the left-turn sign display part and the right-turn sign display part.

For example, in the case where the targeted vehicle runs on a road of a left-hand traffic country, when the driver operates the targeted vehicle to overtakes, the right direction indicator is operated by the driver. Then, the right-turn sign display part shows that the right direction indicator is operated. Therefore, consciousness of the driver is turned to the right.

In this case, if the No overtaking sign image is displayed on the left display part of the display means (i.e., a display part which is near a portion on which the left-turn sign display part is displayed), a fear that the driver whose consciousness is turned to the right gets an odd feeling is large.

However, the display means of the present invention shows the No overtaking sign image on the right display part (i.e., a display part which is near a portion on which the right-turn sign display part is displayed). Therefore, a fear that the driver whose consciousness is turned to the right gets an odd feeling is small.

In the above description, references used in the following descriptions regarding embodiments are added with parentheses to the elements of the present invention, in order to understand the invention. However, those references should not be used to limit the scope of the present invention. Other objects, other features, and accompanying advantages of the present invention are easily understood from the description of embodiments of the present invention to be given referring to the following drawings.

DETAILED DESCRIPTION OF THE PREFERRED EMBODIMENTS

A display device for vehicle according to an embodiment of the present invention will be described hereinafter with reference to the accompanying drawings.

Figure 1:
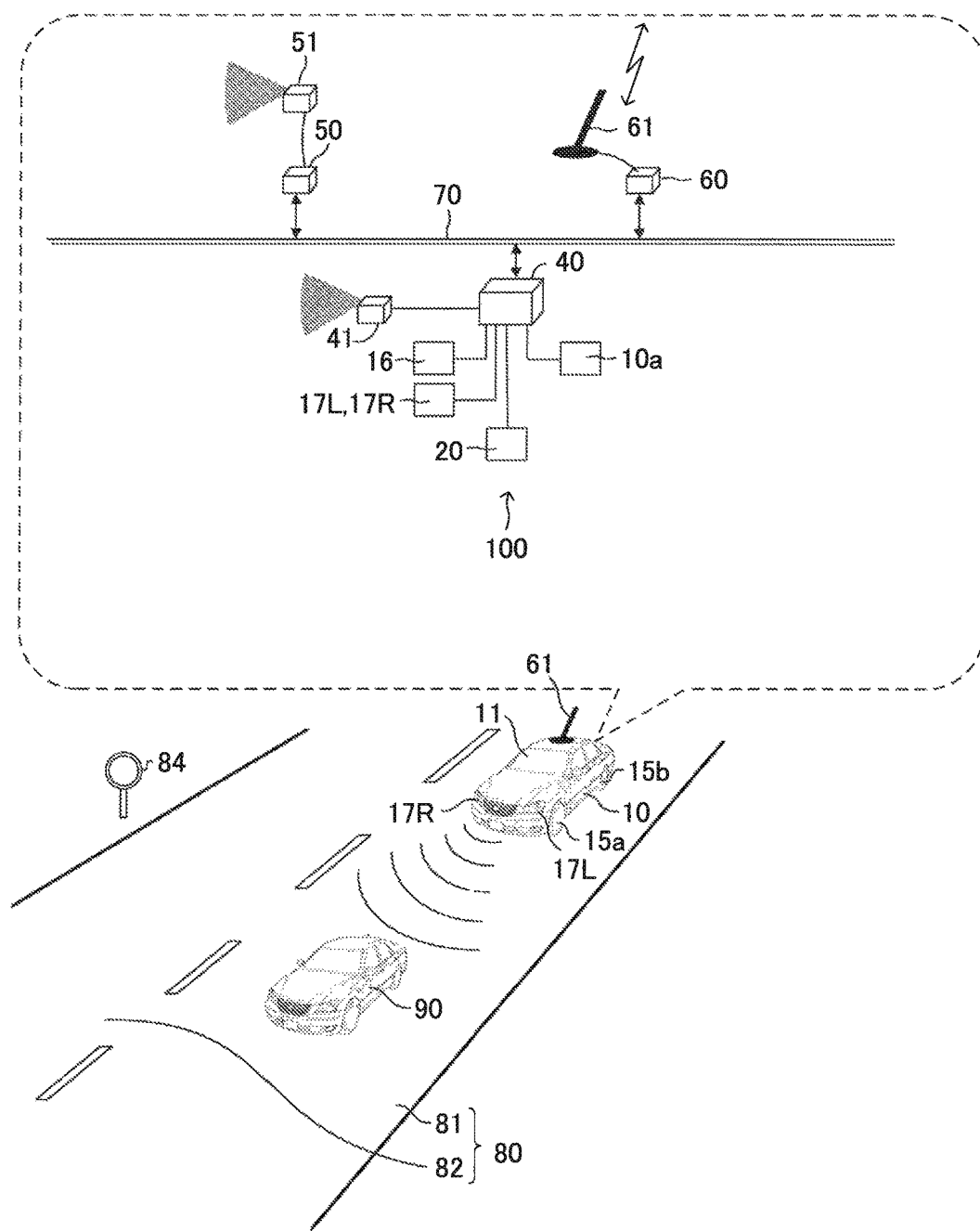
FIG. 1 is a view showing a targeted vehicle having a display device for vehicle according to an embodiment of the present invention, a leading vehicle, and a road on which these vehicles run.

As shown in FIG. 1, the display device for vehicle 100 according to the embodiment of the present invention is installed to a vehicle 10 (hereinafter, it is referred to as a targeted vehicle 10).

The display device for vehicle 100 is provided with a wheel speed sensor 10a, display means 20, a camera control ECU 40, a camera 41, a sensor ECU 50, a radar sensor 51, a GPS control ECU 60, and a GPS receiver 61, all of which will be described later.

Figure 2:
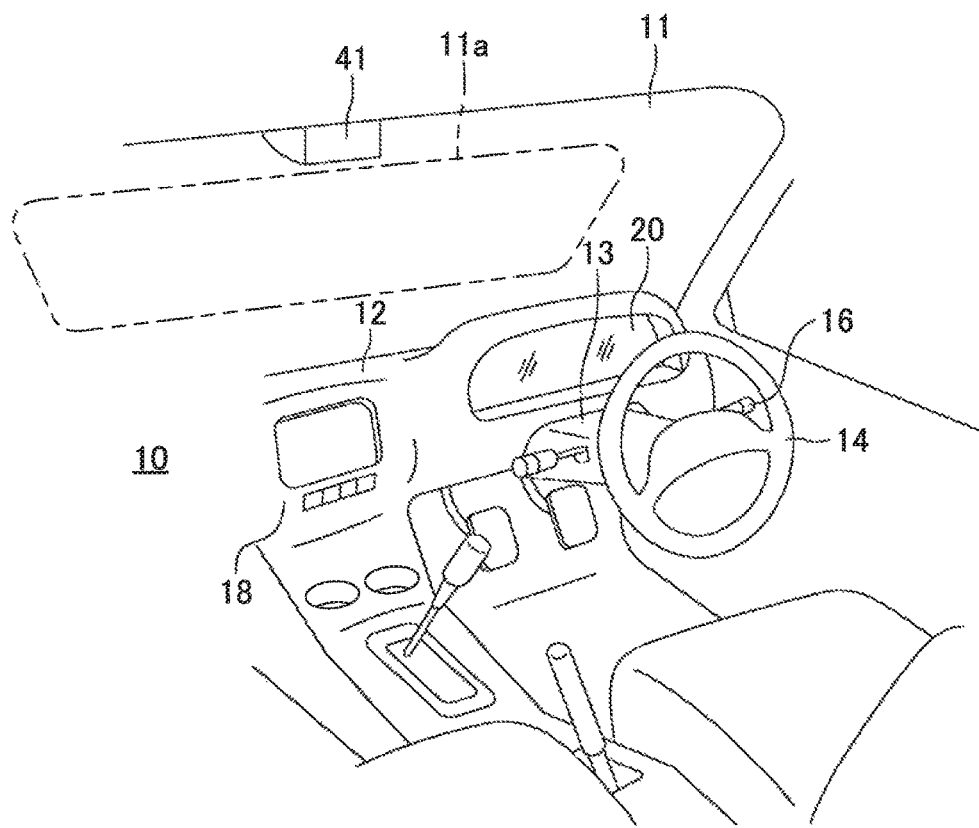
FIG. 2 is a view showing an interior space of the targeted vehicle and a front window of the targeted vehicle.

As shown in FIGS. 1 and 2, the targeted vehicle 10 is provided with a front window 11 which is made of a translucent material.

Furthermore, as shown in FIG. 2, a portion of a front surface of an interior space of the targeted vehicle 10 is composed of a dashboard 12 located below the front window 11. A support portion for steering wheel 13 is provided on a right side portion of the dashboard 12. The support portion for steering wheel 13 projects rearward from the dashboard 12. A steering wheel 14 is rotatably supported by the support portion for steering wheel 13. As is well known, when rotating the steering wheel 14, steering angles of left and right front wheels 15a of the targeted vehicle 10 shown in FIG. 1 are changed.

Furthermore, an operating lever for direction indicator 16 is supported by a right side surface of the support portion for steering wheel 13 so as to be rotatable in the vertical direction. As shown in FIG. 1, left and right pair of direction indicators 17L, 17R are provided on a front surface of the targeted vehicle 10. As is well known, when rotating the operating lever for direction indicator 16 upward from the initial position, a light fixture of the left direction indicator 17L flashes, and when rotating the operating lever for direction indicator 16 downward from the initial position, a light fixture of the right direction indicator 17R flashes.

Additionally, a part of the dashboard 12 is composed of an instrument panel 18. The display means 20 composed of a liquid crystal display is fixed to a right side portion of the instrument panel 18. As shown in FIG. 2, the display means 20 has a substantially rectangular shape having a lateral dimension (i.e., dimension in a left and right direction) longer than its vertical dimension.

As shown in FIGS. 4 to 9, a substantially rectangular main display area 21 is formed in a part of the display means 20. Additionally, a left-turn sign display part 28 and a right-turn sign display part 29 are provided on two parts of the display means 20. The main display area 21 is located between the left-turn sign display part 28 and the right-turn sign display part 29.

Figure 4:
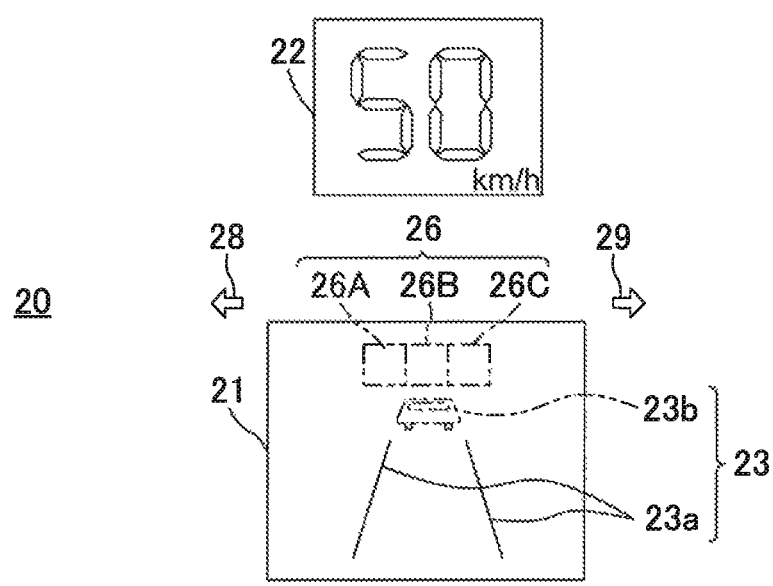
FIG. 4 is a schematic diagram showing a display means.

Furthermore, as shown in FIG. 4, a sub display area 22 is formed on the display means 20. The sub display area 22 is located directly above the main display area 21.

A white line and leading vehicle recognition status display part 23 and a sign display unit 26 located immediately above the white line and leading vehicle recognition status display part 23 are provided on the main display area 21.

The sign display unit 26 is provided with three display parts which are arranged in the lateral direction. In other words, the sign display unit 26 has a left side display part 26A, a central display part 26B, and a right side display part 26C.

It should be noted that types of images showed by the line and leading vehicle recognition status display part 23 and the sign display unit 26 will be described later.

As shown in FIG. 1, the targeted vehicle 10 is equipped with the camera control ECU 40, the sensor ECU 50, and the GPS control ECU 60. These ECUs can exchange data with each other (i.e., these ECUs can communicate with each other) via a communication and sensor systems CAN (Controller Area Network) 70. Noted that ECU is an abbreviation of electric control unit. Each of the ECUs is an electronic control circuit. Each of the ECUs is provided with a microcomputer including a CPU, a ROM, a RAM, an interface and the like, as main components. The CPU achieves a variety of functions described later by executing instructions stored in a memory (ROM).

As shown in FIG. 1, the camera control ECU 40 is connected to the wheel speed sensor 10a, the operating lever for direction indicator 16, the direction indicators 17L, 17R, the display means 20, and the camera 41.

The wheel speed sensor 10a outputs a signal representing rotational speed of each of front wheels 15a and each of rear wheels 15b to the camera control ECU 40. The camera control ECU 40 makes the sub display area 22 show (display) information on the rotational speed of each of front wheels 15a and each of rear wheels 15b obtain from the wheel speed sensor 10a as vehicle speed of the targeted vehicle 10 (see FIG. 4).

Additionally, vehicle information on the targeted vehicle 10 is recorded on the memory of the camera control ECU 40. The vehicle information includes information representing that the steering wheel 14 is provided in the right side of (front surface of) the interior space of the targeted vehicle 10 (namely, the steering wheel 14 is not provided in the left side portion of front surface of the interior space).

As shown in FIG. 1, the camera control ECU 40 is connected to the camera 41. As shown in FIG. 2, the camera 41 is fixed to the upper end portion of the inner surface of the front window 11.

The camera 41 includes a lens and an image pickup device positioned immediately behind the lens (these are not shown). The image pickup device images photographing luminous flux (i.e., object image) which is a natural light reflected rearward by an object positioned in front of the targeted vehicle 10 and passing through the front window 11 and the lens. The data imaged by the image pickup device are repeatedly transmitted to the camera control ECU 40 from the image pickup device at every predetermined time.

"Data for collating country code" and "data for determining passing section" are recorded on the memory of the camera control ECU 40.

As shown in FIG. 1, the sensor ECU 50 is connected to the radar sensor 51. The radar sensor 51 is a well-known millimeter wave radar sensor. The radar sensor 51 transmits a millimeter wave forward from the targeted vehicle 10 in accordance with instructions of the sensor ECU 50. The millimeter wave is reflected rearward by an object which is located in front of the targeted vehicle 10. For example, when a leading vehicle 90 runs in front of the targeted vehicle 10, the millimeter wave is reflected rearward by the leading vehicle 90. Then, the reflected wave is received by the radar sensor 51.

The GPS control ECU 60 is connected to the GPS receiver 61. As is well known, the GPS receiver 61 receives information on the position of the targeted vehicle 10 (hereinafter, it is referred to as "position information") by receiving a GPS signal transmitted from a GPS satellite at every predetermined time. The GPS receiver 61 transmits the obtained position information to the GPS control ECU 60. The GPS control ECU 60 time-serially records the received position information on its RAM.

When receiving the position information from the GPS receiver 61, the GPS control ECU 60 obtains a country code corresponding to the position information by applying the position information to the database that is recorded on its memory. This country code is transmitted from the GPS control ECU 60 to the camera control ECU 40. Then, the camera control ECU 40 identifies the country in which the targeted vehicle 10 is located based on the country code and the data for collating country code.

Additionally, the camera control ECU 40 determines a passing section of vehicles defined by legislation of the country in which the targeted vehicle 10 is located based on the information of the identified country and the data for determining passing section. In other words, the camera control ECU 40 determines whether vehicles have to carry out "left-hand traffic" or vehicles have to carry out "right-hand traffic". In other words, the camera control ECU 40 determines whether the identified country is a left-hand traffic country or a right-hand traffic country.

As shown in FIG. 1, a road 80 on which the targeted vehicle 10 and the leading vehicle 90 are running, has a left side lane 81 and a right side lane 82.

When the camera 41 of the targeted vehicle 10 running with speed equal to or higher than the predetermined speed recognizes (images) a painted lane marking (a white line) on a road while a LDA (Lane Departure Alert) system installed to the targeted vehicle 10 is in a operation state, a drive support ECU (not shown) which is connected to the communication and sensor systems CAN 70 gives an instruction to the display means 20 so that the display means 20 shows a white line recognition state. As a result, the display means 20 shows left and right pair of white lines 23a on the white line and leading vehicle recognition status display part 23 as shown in FIG. 4. For example, when the targeted vehicle 10 runs on a highway, the left and right pair of white lines 23a are displayed on the white line and leading vehicle recognition status display part 23. Furthermore, as shown in FIG. 4, the central display part 26B is positioned on a straight line (not shown) extending vertically and passing through the midpoint between the left and right white lines 23a.

Additionally, when the radar sensor 51 receives a millimeter wave while an ACC (Adaptive Cruise Control) system of the targeted vehicle 10 is in operation state, the drive support ECU determines that the leading vehicle 90 is located in front of the targeted vehicle 10. Then, the drive support ECU gives an instruction to the display means 20 to show a leading vehicle recognition status. As a result, the display means 20 shows a leading vehicle image 23b (see the imaginary line in FIG. 4) on the white line and leading vehicle recognition status display part 23.

On the other hand, when the radar sensor 51 does not receive a millimeter wave, the display means 20 does not show the leading vehicle image 23b on the white line and leading vehicle recognition status display part 23.

As shown in FIG. 1, a number of the road signs 84 (only one road sign 84 is shown in FIG. 1) are installed on the side of the road 80 at intervals.

As is well known, there are a variety of types of road signs 84. The road signs 84 represent kinds of traffic information on the area where each of the road signs 84 is installed. In other words, the road signs 84 include a regulation sign, an instruction sign, and a warning sign. The regulation sign is a sign which prohibits or designates a specific traffic method. The instruction sign allows a specific traffic method. The warning sign notifies an occupant of vehicles about danger on a road and a situation which the occupant must be careful beforehand.

The regulation sign includes, for example, a sign representing limiting speed, a sign representing No parking, a sign representing No entry, a sign representing No overtaking, a sign representing No U-turn, and a sign representing No turn on red (No right-turn on red).

The instruction sign includes, for example, a Parking sign and a Stopping sign.

The warning sign includes, for example, a Railroad crossing sign, a Number of lanes reduced sign, and a Road construction sign.

Additionally, some of road signs 84 represent information closely related with a passing section of vehicles. In other words, some of road signs 84 represent information closely related with whether the country in which road signs 84 are installed is a left-hand traffic country or a right-hand traffic country. In other words, these road signs 84 represent traffic information that is used in only one of left-hand traffic countries and right-hand traffic countries. Such road signs 84 include, for example, the No overtaking sign, the No U-turn sign, and the No turn on red sign. Hereinafter, such road signs 84 are referred to as "passing section-related signs."

Figure 3A:
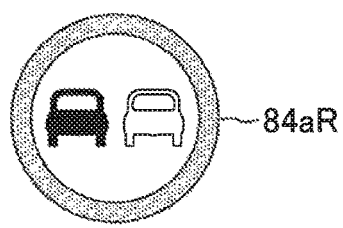
FIG. 3A is a view showing a No overtaking sign used in a right-hand traffic country.
Figure 3B:
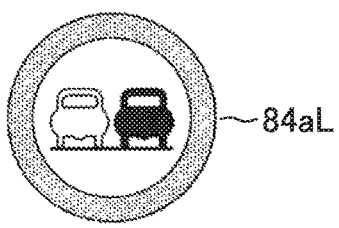
FIG. 3B is a view showing a No overtaking sign used in a left-hand traffic country.

There are two kinds of No overtaking signs which are one of the passing section-related signs. Each of No overtaking signs corresponds to each of passing sections of vehicles. Namely, in a right-hand traffic country, a No overtaking sign 84aR shown in FIG. 3A is used, while in a left-hand traffic country, a No overtaking sign 84aL shown in FIG. 3B is used.

In the case where the No overtaking sign 84aR is installed on the side of the road 80 of a right-hand traffic country, the targeted vehicle 10 running on the right side lane 82 is prohibited from overtaking the leading vehicle 90 using the left side lane 81.

On the other hand, in the case where the No overtaking sign 84aL is installed on the side of the road 80 of a left-hand traffic country, the targeted vehicle 10 running on the left side lane 81 is prohibited from overtaking the leading vehicle 90 using the right side lane 82.

Figure 3C:
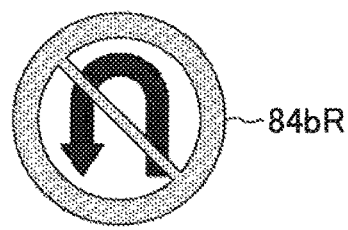
FIG. 3C is a view showing a No U-turn sign used in a right-hand traffic country.
Figure 3D:
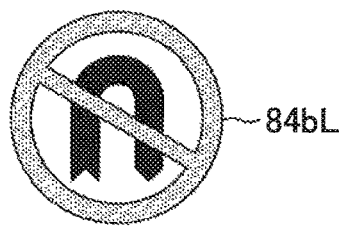
FIG. 3D is a view showing a No U-turn sign used in a left-hand traffic country.

Similarly, there are two kinds of No U-turn signs each of which corresponds to each of passing sections of vehicles. Namely, in a right-hand traffic country, a No U-turn sign 84bR shown in FIG. 3C is used, while in a left-hand traffic country, a No U-turn sign 84bL shown in FIG. 3D is used.

In the case where the No U-turn sign 84bR is installed on the side of the road 80 of a right-hand traffic country, the targeted vehicle 10 running on the road 80 is prohibited from moving to a road (not shown) (hereinafter, this road is referred to as an "opposite side road".) which is positioned on a more left side than the road 80 (the left side lane 81) (in other words, this road is next to the left side lane 81 to the left) while turning left. Vehicles run on this opposite side road in an opposite direction to the targeted vehicle 10 running on the road 80.

On the other hand, in the case where the No U-turn sign 84bL is installed on the side of the road 80 of a left-hand traffic country, the targeted vehicle 10 running on the road 80 is prohibited from moving to an opposite side road which is positioned on a more right side than the road 80 (the right side lane 82) (in other words, this opposite side road is next to the right side lane 82 to the right) while turning right.

Figure 3E:
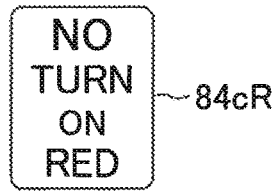
FIG. 3E is a view showing a No turn on red sign.

The No turn on red sign 84cR shown in FIG. 3E is a sign that is used in a right-hand traffic country. Namely, in some of the right-hand traffic countries, even when a traffic sign installed at an intersection is "red", vehicles are allowed to turn right at the intersection as a general rule. However, at the intersection where the No turn on red sign 84cR is installed, vehicles are prohibited from turning right when the traffic signal is "red".

Furthermore, a road sign database having a large number of sign images is recorded on the memory of the camera control ECU 40.

The group of sign images is image data corresponding to each of the road signs 84. Therefore, the group of sign images includes a sign image which corresponds to the passing section-related sign and a sign image which does not correspond to the passing section-related sign.

A sign image corresponding to the passing section-related sign is referred to as a passing section-related sign image. The passing section-related sign image includes, for example, No overtaking sign images 27aR, 27aL, No U-turn sign images 27bR, 27bL, and a No turn on red sign image 27cR (a No right-turn on red sign) (see FIGS. 5 to 9) which will be described later.

A pattern for right-hand traffic country and a pattern for left-hand traffic country are recorded on the memory of the camera control ECU 40.

The pattern for right-hand traffic country defines a correspondence relationship between each of the sign images and each of the left side display part 26A, the central display part 26B, and the right side display part 26C, when the camera control ECU 40 determines that the country where the targeted vehicle 10 is located is a right-hand traffic country based on the position information received by the GPS receiver 61 (or imaged information of the camera 41 described later). The correspondence relationship defined by the pattern for right-hand traffic country of the present embodiment is as follows: the left side display part 26A shows the No overtaking sign image 27aR and the No U-turn sign image 27bR (passing section-related sign image), the central display part 26B shows a speed-related sign (for example, a limiting speed sign image 26X which will be described later), and the right side display part 26C shows speed-auxiliary sign (for example, a limiting speed for rainy weather sign image 26Y which will be described later). It should be noted that the pattern for right-hand traffic country defines a special rule as follows: the No turn on red sign image 27cR (passing section-related sign image) is displayed on the right side display part 26C prior to the speed-auxiliary sign.

On the other hand, a pattern for left-hand traffic country defines a correspondence relationship between each of the sign images and each of the left side display part 26A, the central display part 26B, and the right side display part 26C, when the camera control ECU 40 determines that the country where the targeted vehicle 10 is located is the left-hand traffic country. This correspondence relationship defined by the pattern for left-hand traffic country of the present embodiment is as follows: the left side display part 26A shows the speed-auxiliary sign (for example, the limiting speed for rainy weather sign image 26Y), the central display part 26B shows the speed-related sign (for example, the limiting speed sign image 26X), and the right side display part 26C shows the No overtaking sign image 27aL and the No U-turn sign image 27bL (passing section-related sign image).

The camera control ECU 40 determines whether or not picked up image data, which is received from the camera 41, includes an image coincident with the sign image in the road sign database by performing pattern matching using the road sign database and the picked up image data.

Figure 5:
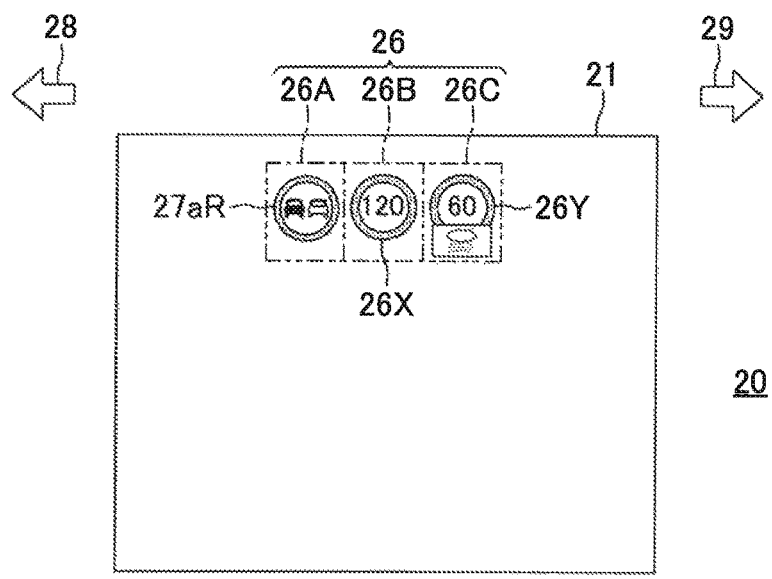
FIG. 5 is a view showing a main display area of the display means which shows a No overtaking sign image when the targeted vehicle runs on a road of a right-hand traffic country.

As a result, for example, when determining that the road sign 84 imaged by the camera 41 is the No overtaking sign 84aR corresponding to the No overtaking sign image 27aR in the road sign database, as shown in FIG. 5 the camera control ECU 40 makes the sign display unit 26 show the No overtaking sign image 27*a*R for a certain period of time.

When the road sign 84 imaged by the camera 41 is the No overtaking sign 84*a*R, the camera control ECU 40 usually determines that a country where the targeted vehicle 10 is running is the right-hand traffic country.

Then, when determining so, as shown in FIG. 5, the camera control ECU 40 makes the left side display part 26A of the sign display unit 26 show the No overtaking sign image 27*a*R for a certain period of time based on the pattern for right-hand traffic country.

In this case, the targeted vehicle 10 usually runs on the right side lane 82. When the targeted vehicle 10 overtakes the leading vehicle 90 located on the right side lane 82, the targeted vehicle 10 overtakes the leading vehicle 90 after moving to the left side lane 81. Therefore, at this time (when operating the targeted vehicle 10 to overtake) the driver of the targeted vehicle 10 is highly likely to look at a more left side than the front.

Additionally, at this time, since the driver operates the operating lever for direction indicator 16 upward from the initial position, a vehicle control ECU (not shown) makes the left-turn sign display part 28 flash. As a result, consciousness of the driver is turned to the left by the flashing left-turn sign display part 28.

Therefore, a risk that the driver who watches the No overtaking sign image 27*a*R displayed on the left side display part 26A gets an odd feeling is small.

In other words, in this case, if the No overtaking sign image 27*a*R is displayed on the right side display part 26C which is the right end portion of the sign display unit 26, a risk that the driver who watches the No overtaking sign image 27*a*R gets an odd feeling becomes large. In particular, in the case where left and right pair of white lines 23*a* are displayed on the white line and leading vehicle recognition status display part 23, since the right side display part 26C is located on a more right side than a road image which is formed between the left and right white lines 23*a*, the risk that the driver gets an odd feeling becomes larger.

Figure 6:
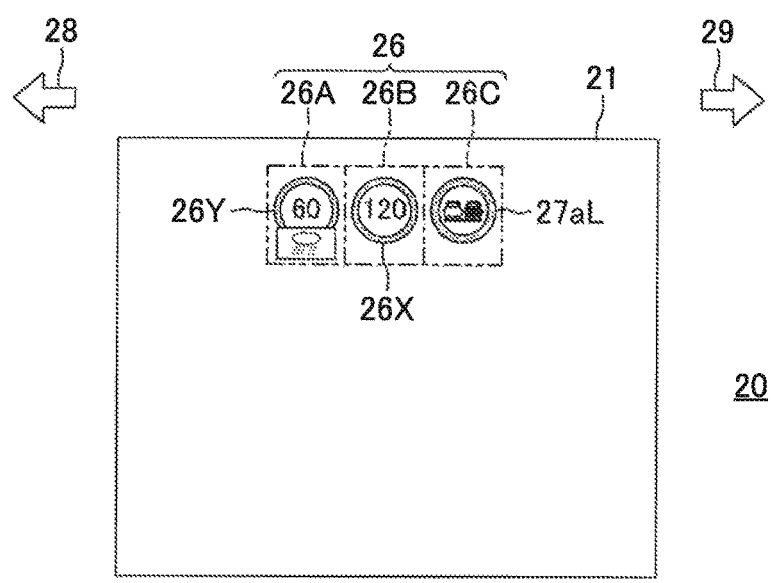
FIG. 6 is a view showing the main display area which shows a No overtaking sign image when the targeted vehicle runs on a road in a left-hand traffic country.

On the other hand, when determining that the road sign 84 imaged by the camera 41 is the No overtaking sign 84*a*L corresponding to the No overtaking sign image 27*a*L in the road sign database, as shown in FIG. 6, the camera control ECU 40 makes the sign display unit 26 show the No overtaking sign image 27*a*L for a certain period of time.

When the road sign 84 imaged by the camera 41 is the No overtaking sign 84*a*L, the camera control ECU 40 usually determines that the country where the targeted vehicle 10 is running is a left-hand traffic country.

Then, when determining so, as shown in FIG. 6, the camera control ECU 40 makes the right side display part 26C of the sign display unit 26 show the No overtaking sign image 27*a*L for a certain period of time based on the pattern for left-hand traffic country.

In this case, the targeted vehicle 10 usually runs on the left side lane 81. When the targeted vehicle 10 overtakes the leading vehicle 90 located on the left side lane 81, the targeted vehicle 10 overtakes the leading vehicle 90 after moving to the right side lane 82. Therefore, when operating the targeted vehicle 10 to overtake, the driver of the targeted vehicle 10 is highly likely to look at a more right side than the front.

Additionally, at this time, since the driver operates the operating lever for direction indicator 16 downward from the initial position, the vehicle control ECU makes the right-turn sign display part 29 flash. As a result, consciousness of the driver is turned to the right by the flashing right-turn sign display part 29.

Therefore, a risk that the driver who watches the No overtaking sign image 27*a*L displayed on the right side display part 26C gets an odd feeling is small.

In other words, in this case, if the No overtaking sign image 27*a*L is displayed on the left side display part 26A which is the left end portion of the sign display unit 26, a risk that the driver who watches the No overtaking sign image 27*a*L gets an odd feeling becomes large. In particular, in the case where left and right pair of white lines 23*a* are displayed on the white line and leading vehicle recognition status display part 23, since the left side display part 26A is located on a more left side than the road image which is formed between the left and right white lines 23*a*, the risk that the driver gets an odd feeling becomes larger.

Furthermore, when the sign display unit 26 shows one of the No overtaking sign image 27*a*R and the No overtaking sign image 27*a*L, the camera control ECU 40 determines whether or not the targeted vehicle 10 is trying to overtake.

When determining that "the targeted vehicle 10 is trying to overtake", the camera control ECU 40 calls the driver's attention by flashing one of the No overtaking sign image 27*a*R and the No overtaking sign image 27*a*L which is displayed on the sign display unit 26.

Noted that, in this case, the camera control ECU 40 may be configured to show one of the No overtaking sign image 27*a*R and the No overtaking sign image 27*a*L in another manner to call the driver's attention rather than flashing one of the No overtaking sign image 27*a*R and the No overtaking sign image 27*a*L.

Figure 7:
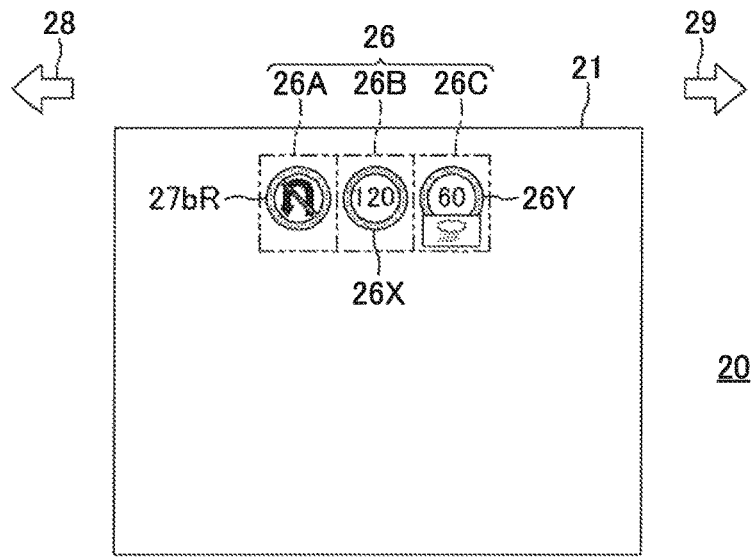
FIG. 7 is a view showing the main display area which shows a No U-turn sign image when the targeted vehicle runs on a road in a right-hand traffic country.

Additionally, when determining that the road sign 84 imaged by the camera 41 is the No U-turn sign 84*b*R corresponding to the No U-turn sign image 27*b*R in the road sign database by performing pattern matching using the road sign database, as shown in FIG. 7 the camera control ECU 40 makes the sign display unit 26 show the No U-turn sign image 27*b*R for a certain period of time.

When the road sign 84 imaged by the camera 41 is the No U-turn sign 84*b*R, the camera control ECU 40 usually determines that the country where the targeted vehicle 10 is running is a right-hand traffic country.

Then, when determining so, as shown in FIG. 7, the camera control ECU 40 makes the left side display part 26A of the sign display unit 26 show the No U-turn sign image 27*b*R for a certain period of time based on the pattern for right-hand traffic country.

In this case, the targeted vehicle 10 usually runs on the right side lane 82. When the targeted vehicle 10 turns (perform U-turn), the driver operates the targeted vehicle 10 to turn left so as to traverse the left side lane 81, and thereby the targeted vehicle 10 moves to the opposite side road positioned on a more left side than the road 80. Therefore, at this time the driver of the targeted vehicle 10 looks at a more left side than the front.

Additionally, at this time, since the driver operates the operating lever for direction indicator 16 upward from the initial position, the vehicle control ECU makes the left-turn sign display part 28 flash. As a result, consciousness of the driver is turned to the left by the flashing left-turn sign display part 28.

Therefore, a risk that the driver who watches the No U-turn sign image 27*b*R displayed on the left side display part 26A gets an odd feeling is small.

In other words, in this case, if the No U-turn sign image 27*b*R is displayed on the right side display part 26C which is the right end portion of the sign display unit 26, a risk that the driver who watches the No U-turn sign image 27bR gets an odd feeling becomes large. In particular, in the case where left and right pair of white lines 23a are displayed on the white line and leading vehicle recognition status display part 23, since the right side display part 26C is located on a more right side than the road image which is formed between the left and right white lines 23a, the risk that the driver gets an odd feeling becomes larger.

Figure 8:
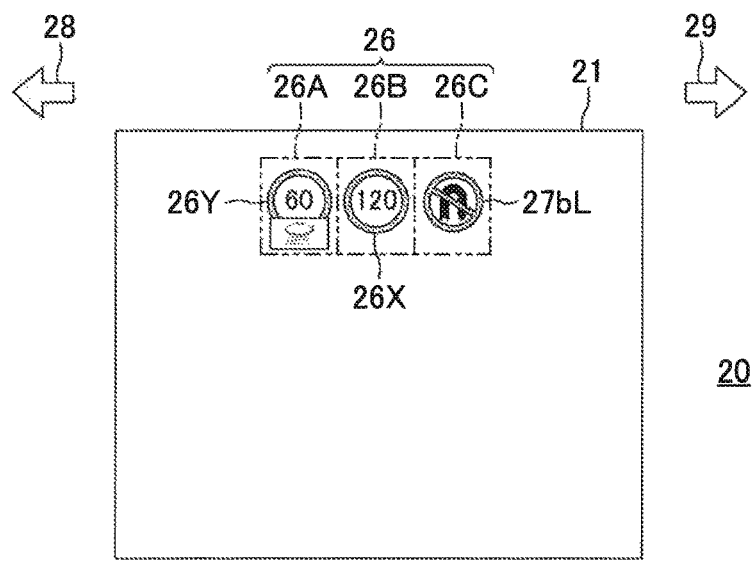
FIG. 8 is a view showing the main display area which shows a No U-turn sign image when the targeted vehicle runs on a road in a left-hand traffic country.

Similarly, when determining that the road sign 84 imaged by the camera 41 is the No U-turn sign 84bL corresponding to the No U-turn sign image 27bL in the road sign database by performing pattern matching using the road sign database, as shown in FIG. 8 the camera control ECU 40 makes the sign display unit 26 show the No U-turn sign image 27bL for a certain period of time.

When the road sign 84 imaged by the camera 41 is the No U-turn sign 84bL, the camera control ECU 40 usually determines that the country where the targeted vehicle 10 is running is a left-hand traffic country.

Then, when determining so, as shown in FIG. 8, the camera control ECU 40 makes the right side display part 26C of the sign display unit 26 show the No U-turn sign image 27bL for a certain period of time based on the pattern for left-hand traffic country.

In this case, the targeted vehicle 10 usually runs on the left side lane 81. When the targeted vehicle 10 turns (perform U-turn), the driver operates the targeted vehicle 10 to turn right so as to traverse the right side lane 82, and thereby the targeted vehicle 10 moves to the opposite side road positioned on a more right side than the road 80. Therefore, at this time the driver of the targeted vehicle 10 looks at a more right side than the front.

Additionally, at this time, since the driver operates the operating lever for direction indicator 16 downward from the initial position, the vehicle control ECU makes the right-turn sign display part 29 flash. As a result, consciousness of the driver is turned to the right by the flashing right-turn sign display part 29.

Therefore, a risk that the driver who watches the No U-turn sign image 27bL displayed on the right side display part 26C gets an odd feeling is small.

In other words, in this case, if the No U-turn sign image 27bL is displayed on the left side display part 26A which is the left end portion of the sign display unit 26, a risk that the driver who watches the No U-turn sign image 27bL gets an odd feeling becomes large. In particular, in the case where left and right pair of white lines 23a are displayed on the white line and leading vehicle recognition status display part 23, since the left side display part 26A is located on a more left side than the road image which is formed between the left and right white lines 23a, the risk that the driver gets an odd feeling becomes larger.

Figure 9:
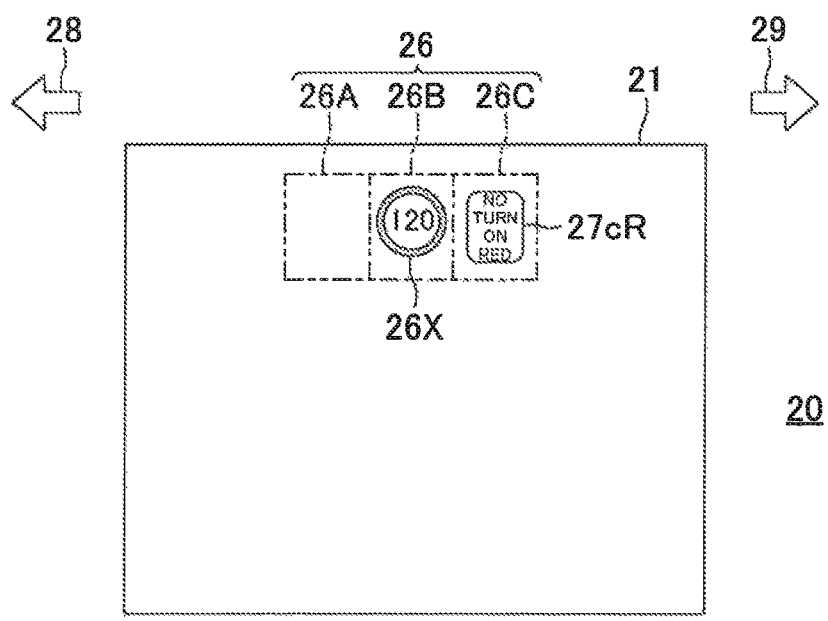
FIG. 9 is a view showing the main display area which shows a No turn on red sign image when the targeted vehicle runs on a road in a right-hand traffic country.

Additionally, when determining that the road sign 84 imaged by the camera 41 is the No turn on red sign 84cR corresponding to the No turn on red sign image 27cR in the road sign database by performing pattern matching using the road sign database, as shown in FIG. 9 the camera control ECU 40 makes the sign display unit 26 show the No turn on red sign image 27cR for a certain period of time.

When the road sign 84 imaged by the camera 41 is the No turn on red sign 84cR, the camera control ECU 40 usually determines that the country where the targeted vehicle 10 is running is a right-hand traffic country.

Then, when determining so, as shown in FIG. 9, the camera control ECU 40 makes the right side display part 26C of the sign display unit 26 show the No turn on red sign image 27cR for a certain period of time based on the pattern for right-hand traffic country.

When the targeted vehicle 10 turns right at an intersection where the No turn on red sign 84cR is installed, in the vicinity of the intersection the targeted vehicle 10 runs on the right side lane 82.

When a traffic signal installed at this intersection is "red", the targeted vehicle 10 is prohibited from turning right at this intersection. Therefore, when the traffic signal is "red", the targeted vehicle 10 stops on the right side lane 82.

At this time, the driver of the targeted vehicle 10 is highly likely to look at a more right side than the front to prepare a turn-right operation when the traffic signal is changed to "green".

Furthermore, at this time, since the driver operates the operating lever for direction indicator 16 downward from the initial position, the vehicle control ECU makes the right-turn sign display part 29 flash. As a result, consciousness of the driver is turned to the right by the flashing right-turn sign display part 29.

Therefore, a risk that the driver who watches the No turn on red sign image 27cR displayed on the right side display part 26C gets an odd feeling is small.

In other words, in this case, if the No turn on red sign image 27cR is displayed on the left side display part 26A which is the left end portion of the sign display unit 26, a risk that the driver who watches the No turn on red sign image 27cR gets an odd feeling becomes large. In particular, in the case where left and right pair of white lines 23a are displayed on the white line and leading vehicle recognition status display part 23, since the left side display part 26A is located on a more left side than the road image which is formed between the left and right white lines 23a, the risk that the driver gets an odd feeling becomes larger.

The camera control ECU 40 selectively makes one of the left side display part 26A and the right side display part 26C shows the passing section-related sign image based on the passing section defined by legislation of the country where the targeted vehicle 10 is currently running.

Therefore, even when, for example, the targeted vehicle 10 moves between a left-hand traffic country (for example, the United Kingdom) and a right-hand traffic country (for example, France), the driver is unlikely to get an odd feeling when looking at the sign display unit 26.

On the other hand, when the picked up image data includes the road sign 84 which is not the passing section-related sign, the camera control ECU 40 selects a sign image corresponding to this road sign 84 from the road sign database and makes the sign display unit 26 shows this sign image. This type of sign images include, for example, the limiting speed sign image 26X and the limiting speed for rainy weather sign image 26Y shown in FIGS. 5 to 9.

Road signs 84 corresponding to these sign images are used in left-hand traffic countries and right-hand traffic countries, and represent the same content in any countries. In other words, these sign images are highly unlikely to provide an odd feeling to a driver who watches the sign display unit 26 even when these sign images are displayed on any one of the left side display part 26A, the central display part 26B, and the right side display part 26C.

As described above, the pattern for right-hand traffic country defines the correspondence relationship. Namely, the central display part 26B shows the speed-related sign (for example, the limiting speed sign image 26X) and the right side display part 26C shows the speed-auxiliary sign (for example, the limiting speed for rainy weather sign image 26Y). Additionally, the pattern for left-hand traffic country defines the correspondence relationship. Namely, the left side display part 26A shows the speed-auxiliary sign (for example, the limiting speed for rainy weather sign image 26Y) and the central display part 26B shows the speed-related sign (for example, the limiting speed sign image 26X).

Therefore, the camera control ECU 40 makes any one of the left side display part 26A, the central display part 26B, and the right side display part 26C show these sign images for a certain period of time in accordance with the pattern for right-hand traffic country or the pattern for left-hand traffic country.

Furthermore, the camera control ECU 40 refers to a database for relationship between sign and passing section recorded on the memory of the camera control ECU 40 when the road sign 84 imaged by the camera 41 is the passing section-related sign (i.e., when the road sign 84 is coincident with the passing section-related sign image in the road sign database by performing pattern matching).

This database for relationship between sign and passing section represents whether the passing section-related sign imaged by the camera 41 (and the passing section-related sign image corresponding to this passing section-related sign) is used in a right-hand traffic country or a left-hand traffic country.

Therefore, when the received picked up image data includes the passing section-related sign, the camera control ECU 40 determines whether this passing section-related sign (and the passing section-related sign image corresponding to this passing section-related sign) is used in a right-hand traffic country or a left-hand traffic country based on the database for relationship between sign and passing section.

However, the camera control ECU 40 may refer to the database for relationship between sign and passing section only when the camera control ECU 40 selects passing section-related sign images all of which correspond to the same passing section from the road sign database equal to or more than a predetermined times (multiple times). For example, if the resolution of the data imaged by the camera 41 is low, there is a fear that the camera control ECU 40 cannot perform pattern matching using the road sign 84 imaged by the camera 41 and the road sign database with high accuracy. In other words, there is a fear that the camera control ECU 40 selects a sign image which does not correspond to the road sign 84 imaged by the camera 41 from the road sign database. However, when the camera control ECU 40 selects passing section-related sign images all of which correspond to the same passing section from the road sign database equal to or more than the predetermined times, it can be assumed that the pattern matching is performed with high accuracy. Therefore, if the determination is carried out in such a manner, whether the country where the targeted vehicle 10 is currently located is a right-hand traffic country or a left-hand traffic country can be determined with high accuracy based on the road sign 84 imaged by the camera 41. Noted that, "to select the predetermined times" means to include not only "to select the same passing section-related sign image (for example, the No overtaking sign image 27aR) the predetermined times" but also "to select passing section-related sign images different from each other (for example, the No overtaking sign image 27aR and the No U-turn sign image 27bR) the predetermined times (which is total number of times)".

The camera control ECU 40 can determine whether the country where the targeted vehicle 10 is currently located is a right-hand traffic country or a left-hand traffic country based on the picked up image data imaged by the camera 41 instead of the above-mentioned position information which the GPS receiver 61 receives from the GPS satellite.

However, when the GPS receiver 61 receives the position information, it is preferable to determine the passing section by using the position information instead of the picked up image data.

Subsequently, the operation of the display device for vehicle 100 of the targeted vehicle 10 running on the road 80 will be described with reference to the flowcharts of FIGS. 10 and 11.

Figure 10:
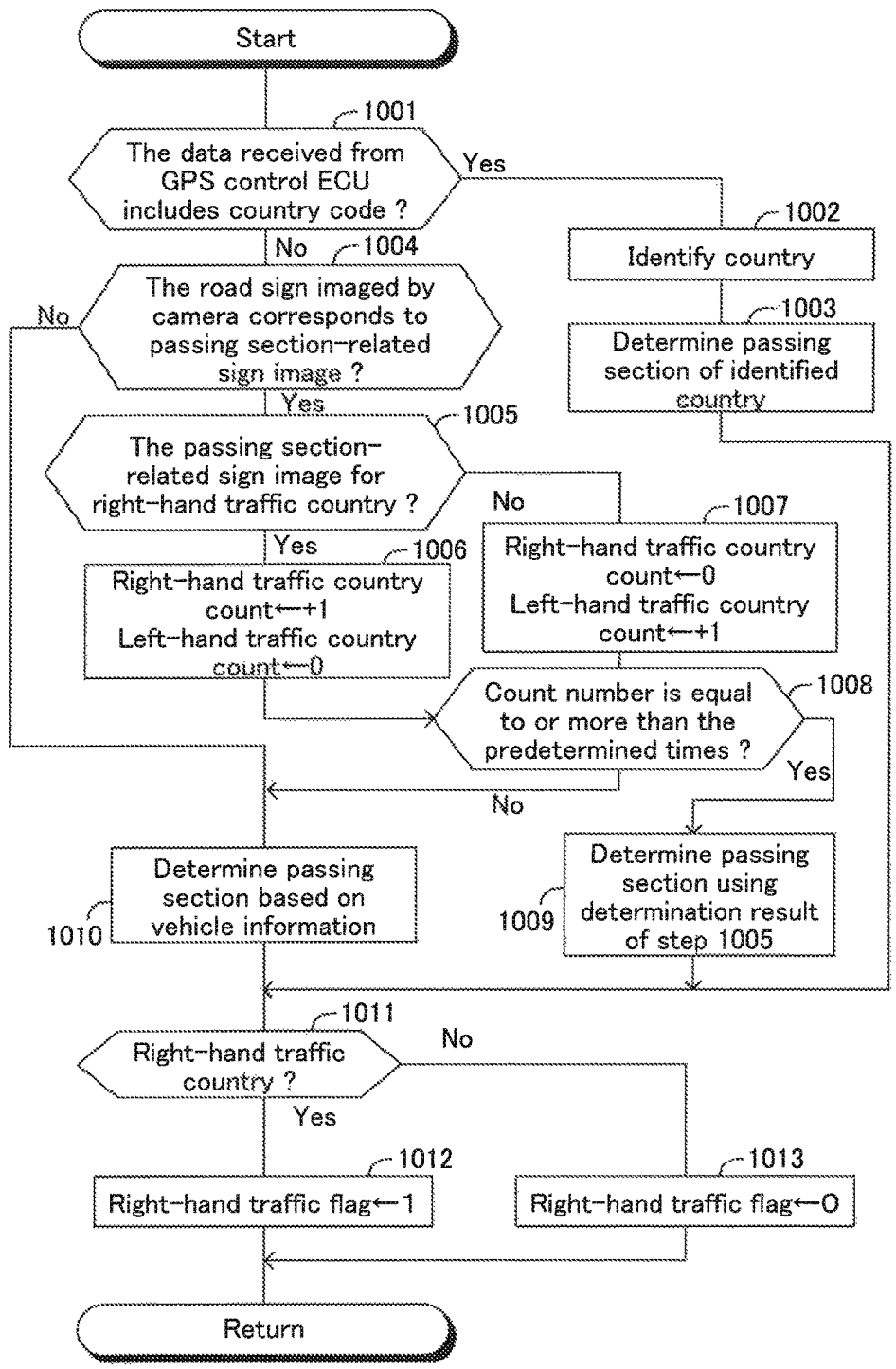
FIG. 10 is a flowchart showing a process which is carried out by a camera control ECU to determine a passing section.

When a battery (not shown) of the targeted vehicle 10 is in a state where the battery can supply electricity to the wheel speed sensor 10a, the direction indicators 17L, 17R, the display means 20, the drive support ECU, the camera control ECU 40, the camera 41, the sensor ECU 50, the radar sensor 51, the GPS control ECU 60, and the GPS receiver 61 and an engine of the targeted vehicle 10 is started by the operation of the ignition key (not shown), the camera control ECU 40 repeatedly carries out a routine shown in the flowchart of FIG. 10.

First, at step 1001, the camera control ECU 40 determines whether or not the data received from the GPS control ECU 60 (the GPS receiver 61) includes the country code.

When determining that the country code is included at step 1001, the camera control ECU 40 proceeds to step 1002, and identify the country in which the targeted vehicle 10 is located based on the country code received from the GPS receiver 61 and the data for collating country code recorded on the memory of the camera control ECU 40.

Subsequently, the camera control ECU 40 proceeds to step 1003, and the camera control ECU 40 determines the passing section of the country where the targeted vehicle 10 is located based on information on the country identified at step 1002 and the data for determining passing section recorded on the memory of the camera control ECU 40. In other words, the camera control ECU 40 determines whether the country is a right-hand traffic country or a left-hand traffic country.

For example, if the country identified at step 1002 is the United Kingdom, at step 1003 the camera control ECU 40 determines that "this country is a left-hand traffic country". On the other hand, for example, if the country identified at step 1002 is France, at step 1003 the camera control ECU 40 determines that "this country is a right-hand traffic country".

On the other hand, when determining that the country code is not included at step 1001, the camera control ECU 40 proceeds to step 1004, and determines whether or not the picked up image data imaged by the camera 41 includes the passing section-related sign. In other words, the camera control ECU 40 determines whether or not the road sign 84 imaged by the camera 41 is coincident with the passing section-related sign image in the road sign database by performing pattern matching.

When determining Yes at step 1004, the camera control ECU 40 proceeds to step 1005, and determines whether the passing section-related sign image corresponding to the road sign 84 imaged by the camera 41 is for a right-hand traffic country or for a left-hand traffic country with reference to the database for relationship between sign and passing section.

When determining that "the passing section-related sign image (the road sign 84) is for a right-hand traffic country" at step 1005, the camera control ECU 40 proceeds to step 1006. Then, the camera control ECU 40 adds "1" to the sum (the total value) of the right-hand traffic country count number, and set the sum of the left-hand traffic country count number to"0".

On the other hand, when determining that the "the passing section-related sign image (the road sign 84) is for a left-hand traffic country" at step 1005, the camera control ECU 40 proceeds to step 1007. Then, the camera control ECU 40 adds "1" to the sum of the left-hand traffic country count number, and set the sum of the right-hand traffic country count number to "0".

The camera control ECU 40 that has completed the process of steps 1006 or 1007 proceeds to step 1008, and determines whether or not the sum of the left-hand traffic country count number or the sum of the right-hand traffic country count number is equal to or more than the predetermined times.

The camera control ECU 40 which has determined that "step 1008 is Yes" proceeds to step 1009, and determines the passing section of the country where the targeted vehicle 10 is running using determination result of step 1005.

Namely, for example, when determining that "the passing section-related sign image (the road sign 84) is for a right-hand traffic country" at step 1005, the camera control ECU 40 determines that "the country where the targeted vehicle 10 is running is a right-hand traffic country".

The camera control ECU 40 that has completed the process of steps 1003 or 1009 proceeds to step 1011, and determines whether or not the country where the targeted vehicle 10 is located is a right-hand traffic country by using the determination result of steps 1003 or 1009.

For example, when a place in which the targeted vehicle 10 is positioned is (a part of) France, the camera control ECU 40 determines that this country is a right-hand traffic country and proceeds to step 1012. Then, the camera control ECU 40 sets a right-hand traffic flag to "1" at step 1012.

On the other hand, for example, when a place in which the targeted vehicle 10 is positioned is (a part of) the United Kingdom, the camera control ECU 40 determines that this country is a left-hand traffic country at step 1011 and proceeds to step 1013. Then, the camera control ECU 40 sets the right-hand traffic flag to "0" at step 1013.

On the other hand, when determining that "step 1004 is No" (namely, when determining that the data received from the GPS control ECU 60 does not include the country code and the picked up image data imaged by the camera 41 does not include the passing section-related sign, the camera control ECU 40 proceeds to step 1010.

Similarly, when determining that "step 1008 is No" (namely, that the sum of the left-hand traffic country count number or the sum of the right-hand traffic country count number is less than the predetermined times), the camera control ECU 40 proceeds to step 1010.

Then, the camera control ECU 40 determines whether the steering wheel 14 is provided on the right side portion of the interior space (the dashboard 12) or on the left side portion of the interior space (the dashboard 12) based on the vehicle information recorded on its memory at step 1010. Then, when determining that the steering wheel 14 is provided on the right side portion of the interior space (the dashboard 12), the camera control ECU 40 assumes that "the country where the targeted vehicle 10 is located is a left-hand traffic country". On the other hand, when determining that the steering wheel 14 is provided on the left side portion of the interior space (the dashboard 12), the camera control ECU 40 assumes that "the country where the targeted vehicle 10 is located is a right-hand traffic country".

Since the steering wheel 14 is provided on the right side portion of the interior space (the dashboard 12) of the targeted vehicle 10 in this embodiment, the camera control ECU 40 determines that "the country where the targeted vehicle 10 is located is a left-hand traffic country" at step 1010 and proceeds to step 1013.

On the other hand, when determining that "the country where the targeted vehicle 10 is located is a right-hand traffic country" (namely, if the steering wheel 14 is provided on a left side portion of the interior space (the dashboard 12)) at step 1010, the camera control ECU 40 proceeds to step 1012.

The camera control ECU 40 that has completed the process of steps 1012 or 1013 temporarily ends the routine.

Figure 11:
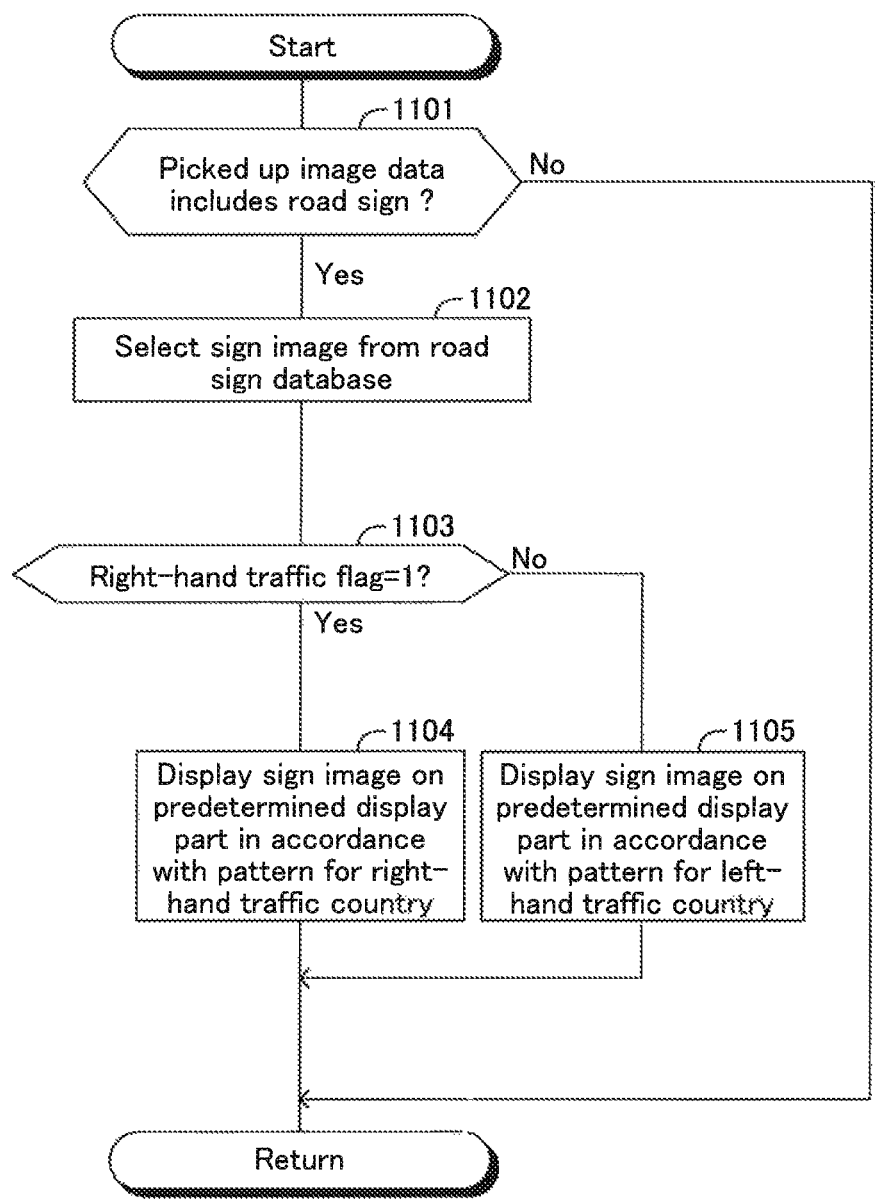
FIG. 11 is a flowchart showing a process which is carried out by the camera control ECU to display sign images.

When the ignition key is operated, the camera control ECU 40 further repeatedly carries out the routine shown in the flowchart of FIG. 11.

First, the camera control ECU 40 performs pattern matching using the road sign database recorded on the memory of the camera control ECU 40 and the picked up image data which is transmitted from the camera 41 to the camera control ECU 40 at step 1101. The camera control ECU 40 determines whether or not the picked up image data includes an image corresponding to the sign image in the road sign database.

When determining that "step 1101 is Yes", the camera control ECU 40 proceeds to step 1102 and selects a sign image which is coincident with the picked up image data from the road sign database.

For example, the picked up image data includes a road sign 84 representing "limiting speed is 120 km/h", the camera control ECU 40 selects the limiting speed sign image 26X from the road sign database. Furthermore, when the picked up image data includes a road sign 84 representing "limiting speed at the time of rainy weather is 60 km/h", the camera control ECU 40 selects the limiting speed for rainy weather sign image 26Y from the road sign database.

When the picked up image data includes the No overtaking sign 84aR or the No overtaking sign 84aL, as shown in FIGS. 5 and 6, the camera control ECU 40 selects the No overtaking sign image 27aR or the No overtaking sign image 27aL from the road sign database.

When the picked up image data includes the No U-turn sign 84bR or the No U-turn sign 84bL, as shown in FIGS. 7 and 8, the camera control ECU 40 selects the No U-turn sign image 27bR or the No U-turn sign image 27bL from the road sign database.

When the picked up image data includes the No turn on red sign 84cR, as shown in FIG. 9, the camera control ECU 40 selects the No turn on red sign image 27cR from the road sign database.

The camera control ECU 40 which has completed the process of step 1102 proceeds to step 1103, and determines whether or not the right-hand traffic flag is "1".

When determining that "step 1103 is Yes", the camera control ECU 40 proceeds to step 1104. Then, based on the pattern for right-hand traffic country, the camera control ECU 40 makes any one of the left side display part 26A, the central display part 26B, and the right side display part 26C show the sign image selected at step 1102 for a certain period of time.

On the other hand, when determining that "step 1103 is No", the camera control ECU 40 proceeds to step 1105. Then, based on the pattern for left-hand traffic country, the camera control ECU 40 makes any one of the left side display part 26A, the central display part 26B, and the right side display part 26C show the sign image selected at step 1102 for a certain period of time.

The camera control ECU 40 that has completed the process of steps 1004 and 1005 temporarily ends the routine.

The present invention is not limited to the above embodiment. Various modifications can be made within the scope of the present invention.

The position of the main display area 21 and/or the position of the sub display area 22 in the display means 20 can be changed from the position (s) of the above embodiment. For example, the main display area 21 can be positioned on a more left side than the left-turn sign display part 28 or on a more right side than the right-turn sign display part 29.

The position of the sign display unit 26 in the main display area 21 can be changed from the position in the above embodiment.

The sign display unit 26 may include two display parts arranged in a lateral direction or equal to or more than four display parts arranged in a lateral direction.

Figure 12:
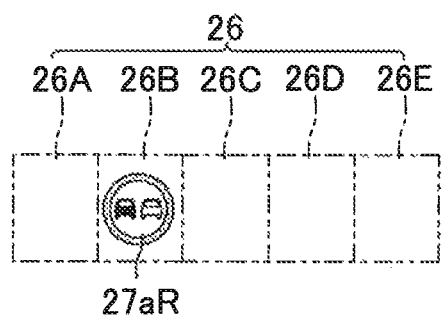
FIG. 12 is a schematic diagram showing a display means according to a modified embodiment of the present invention.

In the modified embodiment shown in FIG. 12, the sign display unit 26 is provided with five display parts 26A, 26B, 26C, 26D, and 26E which are arranged in a lateral direction. In this case, the camera control ECU 40 also does not make the display part 26C, which is located at the center of the sign display unit 26, show the passing section-related sign image. In other words, based on the pattern for right-hand traffic country or the pattern for left-hand traffic country, the passing section-related sign image is selectively displayed on the left side display parts 26A, 26B which are located on a more left side than the central display part 26C of the sign display unit 26 or on the right side display parts 26D, 26E which are located on a more right side than the central display part 26C of the sign display unit 26. Therefore, for example, as shown in FIG. 12, the camera control ECU 40 makes the second display part 26B from the left show the No overtaking sign image 27aR. It should be noted that, in this case, the No overtaking sign image 27aR may be displayed on the left end display part 26A. Similarly, for example, the camera control ECU 40 makes the second display part 26D from the right or the right end display part 26E show the No overtaking sign image 27aL.

Figure 13:
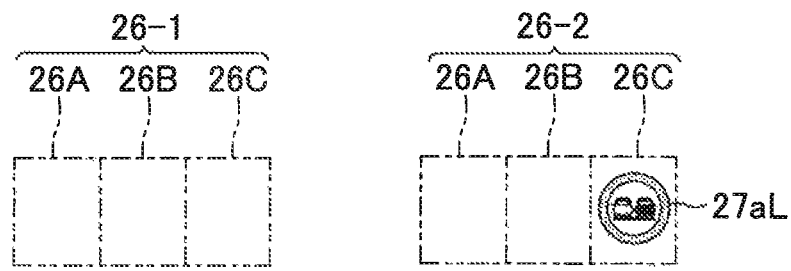
FIG. 13 is a schematic diagram showing a display means according to another modified embodiment of the present invention.

In the modified embodiment shown in FIG. 13, two sign display units 26-1, 26-2 spaced from each other in a lateral direction are provided in the main display area 21.

In this case, for example as illustrated, the camera control ECU 40 makes any one of display parts 26A, 26B, 26C of the right side sign display unit 26-2 (right side display part) show the No overtaking sign image 27aL. Similarly, for example, the camera control ECU 40 makes any one of display parts 26A, 26B, 26C of the left side sign display unit 26-1 (left side display part) show the No overtaking sign image 27aR.

Additionally, a left-hand traffic country, in which the targeted vehicle 10 is located, may have legislation which allows vehicles to turn left at an intersection as a general rule when a traffic signal installed at this intersection is "red". When a No turn on red sign (a No left-turn on red sign), which exceptionally prohibits vehicles from turning left at an intersection in the case where a traffic signal is "red", is regulated by the legislation of such a left-hand traffic country, a sign image corresponding to this No turn on red sign may be displayed on the left side display part of each of the above sign display units.

Instead of the GPS control ECU 60 and the GPS receiver 61, the targeted vehicle 10 may be provided with means which can receive information from a satellite of the Global Navigation Satellite System (GNSS) other than GPS (e.g., Galileo) and can exchange data (can communicate) with the camera control ECU 40 and the sensor ECU 50.

The targeted vehicle 10 may be provided with a vehicle-mounted device capable of wireless communicating with a roadside device installed along a road.

As is well known, the roadside device sends a variety of traffic information. The content of this information is the same as the traffic information represented by each of the road signs 84.

Therefore, the targeted vehicle 10 configured in such a manner can perform pattern matching using the traffic information from the roadside device and the road sign database and can make the display means 20 show the sign images selected from the road sign database.

Display means for displaying, for example, the vehicle speed of the targeted vehicle 10 and/or sign image may be installed to a part of the targeted vehicle 10 other than the instrument panel 18.

For example, a windscreen 11a (see a phantom line in FIG. 2) may be used as the display means. The windscreen 11a forms a part of the front window 11 and can project an image generated by a head-up display unit (not shown). In this case, a sign display unit (which has a plurality of display parts arranged in a lateral direction) corresponding to the sign display unit 26 (26-1, 26-2) is formed on the windscreen 11a. Furthermore, each of the passing section-related sign images is selectively displayed on a right side display part or a left side display part of this sign display unit.

What is claimed is:

1. A display device for a vehicle, the display device being installed on a targeted vehicle, the display device comprising:
   a determination means that determines whether legislation in a country having a road on which the targeted vehicle is running requires that vehicles have to keep to the left or requires that the vehicles have to keep to the right;
   a display means including a plurality of display parts arranged in a lateral direction, the plurality of display parts including a left side display part and a right side display part, each of the display parts being configured to display an image of a road sign, the image corresponding to a road sign of a plurality of road signs of the country, and the plurality of road signs including a plurality of country-specific regulation road signs that each represents traffic information related to whether the vehicles have to keep to the left or have to keep to the right in compliance with the legislation;
   a sign information obtaining means that obtains sign information, the sign information identifying the road sign with which a driver of the targeted vehicle has to comply; and
   a display position changing means that, when the road sign identified based on the obtained sign information is a country-specific regulation road sign, selectively makes one of the left side display part, which is positioned on a more left side than a center of the display in a lateral direction, and the right side display part, which is positioned on a more right side than the center, show an image of the country-specific regulation road sign, the image of the country-specific regulation road sign being selectively displayed in one of the left side display part and the right side display part based on whether the determination means determined that the vehicles have to keep to the left or have to keep to the right in compliance with the legislation.

2. The display device for vehicle according to claim 1, wherein the plurality of country-specific regulation road signs includes a no overtaking sign, and when the road sign identified based on the obtained sign information is the no overtaking sign, the display position changing means is configured to:

cause the right side display part to show an image of a road sign corresponding to the no overtaking sign when the determination means determines that vehicles have to keep to the left in compliance with the legislation; and cause the left side display part to show an image of a road sign corresponding to the no overtaking sign when the determination means determines that vehicles have to keep to the right in compliance with the legislation.

3. The display device for vehicle according to claim 2, wherein the plurality of country-specific regulation road signs further includes a no U-turn sign, and the display position changing means is configured to:

cause the right side display part to show an image of a road sign corresponding to the no U-turn sign when the determination means determines that vehicles have to keep to the left in compliance with the legislation; and cause the left side display part to show an image of a road sign corresponding to the no U-turn sign when the determination means determines that vehicles have to keep to the right in compliance with the legislation.

4. The display device for vehicle according to claim 1, wherein the plurality of country-specific regulation road signs includes a no U-turn sign, and when the road sign identified based on the obtained sign information is the no U-turn sign, the display position changing means is configured to:

cause the right side display part to show an image of a road sign corresponding to the no U-turn sign when the determination means determines that vehicles have to keep to the left in compliance with the legislation; and cause the left side display part to show an image of a road sign corresponding to the no U-turn sign when the determination means determines that vehicles have to keep to the right in compliance with the legislation.

5. The display device for vehicle according to claim 1, wherein the plurality of country-specific regulation road signs includes a no right-turn on red sign and a no left-turn on red sign, and when the road sign identified based on the obtained sign information is either the no right-turn on red sign or the no left-turn on red sign, the display position changing means is configured to:

cause the left side display part to show an image of a road sign corresponding to the no left-turn on red sign when the determination means determines that vehicles have to keep to the left in compliance with the legislation; and cause the right side display part to show an image of a road sign corresponding to the no right-turn on red sign when the determination means determines that the vehicles have to keep to the right in compliance with said legislation.

6. The display device for vehicle according to claim 1, wherein the display means comprises:

a left-turn sign display part showing that a left direction indicator installed on the targeted vehicle is operated; and a right-turn sign display part showing that a right direction indicator installed on the targeted vehicle is operated, the right-turn sign display part being positioned on a more right side than the left-turn sign display part, and wherein the plurality of display parts are disposed between the left-turn sign display part and the right-turn sign display part.

* * * * *